(12) United States Patent
Tajima et al.

(10) Patent No.: US 11,965,750 B2
(45) Date of Patent: Apr. 23, 2024

(54) NAVIGATION DEVICE, NAVIGATION SYSTEM, AND ROUTE GUIDANCE METHOD

(71) Applicant: HONDA MOTOR CO., LTD., Tokyo (JP)

(72) Inventors: Koji Tajima, Tokyo (JP); Arata Hayashi, Tokyo (JP); Katsutoshi Noritake, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 197 days.

(21) Appl. No.: 17/675,522

(22) Filed: Feb. 18, 2022

(65) Prior Publication Data
US 2022/0316902 A1  Oct. 6, 2022

(30) Foreign Application Priority Data
Mar. 30, 2021  (JP) .................. 2021-057306

(51) Int. Cl.
*G01C 21/36* (2006.01)
*B60K 35/00* (2006.01)
*B60K 35/28* (2024.01)
*B60K 35/65* (2024.01)

(52) U.S. Cl.
CPC ........... *G01C 21/367* (2013.01); *B60K 35/00* (2013.01); *B60K 35/28* (2024.01); *B60K 35/654* (2024.01); *B60K 2360/166* (2024.01)

(58) Field of Classification Search
CPC .............................. G01C 21/367; B60K 35/00
See application file for complete search history.

(56) References Cited

U.S. PATENT DOCUMENTS

| | | | | |
|---|---|---|---|---|
| 5,587,911 A | * | 12/1996 | Asano ................ | G01C 21/367 701/428 |
| 2007/0057781 A1 | * | 3/2007 | Breed ................ | B60K 35/00 340/457.1 |
| 2008/0103693 A1 | * | 5/2008 | Kato ................ | G08G 1/096883 701/533 |
| 2010/0256904 A1 | * | 10/2010 | Ishibashi ........... | G01C 21/3682 701/533 |
| 2012/0197520 A1 | * | 8/2012 | Itabashi ........... | H04N 21/41422 709/217 |
| 2019/0033088 A1 | * | 1/2019 | Deng ................ | G01C 21/367 |

FOREIGN PATENT DOCUMENTS

JP   2003-269967 A   9/2003

* cited by examiner

*Primary Examiner* — Seth A Silverman
(74) *Attorney, Agent, or Firm* — Rankin, Hill & Clark LLP

(57) ABSTRACT

A navigation device includes a map display unit configured to display a map on a first display device and display a guidance route and a current position on the map, and a scale determination unit configured to determine a scale of the map to be displayed on the first display device. The scale determination unit lowers the scale as the current position approaches an intersection at which it is required to turn, and enlarges the scale as the current position moves through the intersection.

14 Claims, 8 Drawing Sheets

NAVIGATION DEVICE, NAVIGATION SYSTEM, AND ROUTE GUIDANCE METHOD

INCORPORATION BY REFERENCE

The present application claims priority under 35 U.S.C. § 119 to Japanese Patent Application No. 2021-057306 filed on Mar. 30, 2021. The content of the application is incorporated herein by reference in its entirety.

BACKGROUND OF THE INVENTION

Field of the Invention

The present invention relates to a navigation device, a navigation system, and a route guidance method.

Description of the Related Art

Japanese Patent Laid-Open No. 2003-269967 discloses a navigation device that changes the scale of a map to be displayed as a subject vehicle approaches an intersection that requires the vehicle to turn to the right or left along a guidance route, so that the map including the current position and this intersection is gradually enlarged and displayed.

A guidance route displayed by a navigation device may require a vehicle to repetitively turn to the right or left depending on the connection state of roads, for example, at two or more intersections adjacently positioned. According to such a route requiring a vehicle to successively turn at two or more intersections adjacently positioned, drivers are required to obtain, at the time of passing through one intersection, information about a route to the next intersection, in advance.

However, the above-mentioned navigation device is only useful in that the map including the current position of the subject vehicle and one intersection is gradually enlarged and displayed as the vehicle approaches this intersection, but information about a route to the next intersection may be missing on the displayed map. As a result, driver's preparatory actions for the next intersection would be delayed. This possibly hinders the travelling of the subject vehicle.

From the above background, the present invention intends to effectively assist users in realizing smooth moving, even when a guidance route includes two or more adjacently positioned intersections each requiring a vehicle's turning operation.

SUMMARY OF THE INVENTION

An aspect of the present invention is a navigation device that displays a guidance route to a destination on a map, including a map display unit configured to display a map on a first display device and display the guidance route and a current position on the map, and a scale determination unit configured to determine a scale of the map to be displayed on the first display device, wherein the scale determination unit lowers the scale as the current position approaches an intersection at which it is required to turn along the guidance route, and enlarges the scale as the current position moves through the intersection.

Another aspect of the present invention is a navigation system including the navigation device provided in a vehicle and the first display device provided in the vehicle, in which the navigation device further includes a preceding vehicle information acquisition unit configured to acquire information about a preceding vehicle ahead of the vehicle, the preceding vehicle travelling within a predetermined distance from the current position, and the scale determination unit holds the scale at a present value while the preceding vehicle is detected.

Still another aspect of the present invention is a route guidance method executed by a computer, including a step of determining a scale of a map to be displayed on a display device, a step of displaying the map indicating a guidance route and a current position on the display device at the scale determined in the determination step, wherein the determination step includes lowering the scale as the current position approaches an intersection at which it is required to turn along the guidance route, and enlarging the scale as the current position moves through the intersection.

Advantageous Effects of Invention

According to the present invention, it is possible to effectively assist users in realizing smooth moving, even when a guidance route includes two or more adjacently positioned intersections each requiring a vehicle's turning operation.

DETAILED DESCRIPTION OF THE PREFERRED EMBODIMENTS

Figure 1:
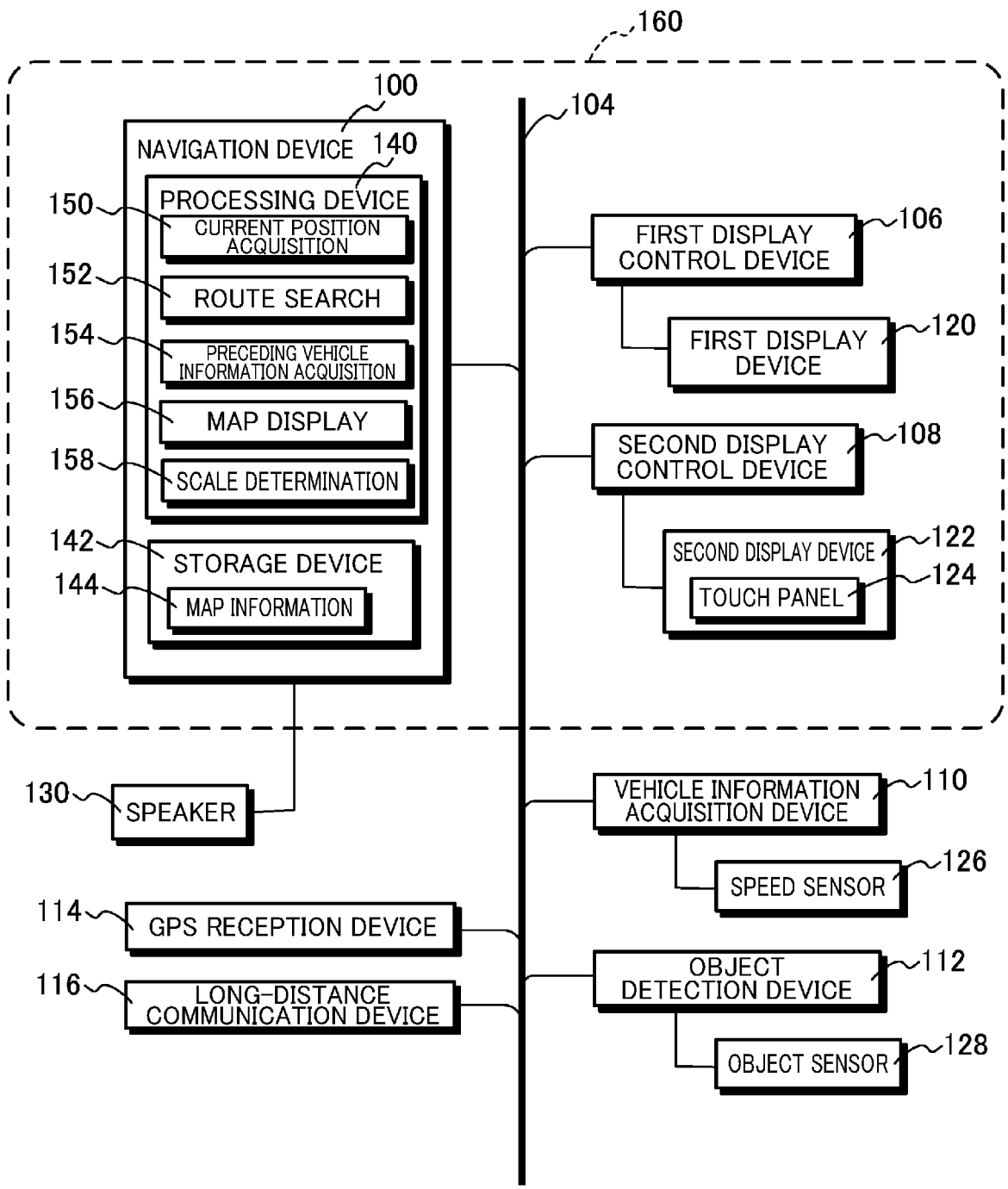
FIG. 1 is a diagram illustrating a configuration of a navigation device and a navigation system according to an embodiment of the present invention.

Hereinafter, an embodiment of the present invention will be described with reference to attached drawings. FIG. 1 is a diagram illustrating a configuration of a navigation device and a navigation system according to an embodiment of the present invention. This navigation device 100 is mounted on or connected to a vehicle 102 for use. In the present embodiment, the vehicle 102 is a four-wheeled vehicle.

The navigation device 100 operates together with various devices provided in the vehicle 102 via a network bus 104. These devices may include a first display control device 106, a second display control device 108, a vehicle information acquisition device 110, an object detection device 112, a GPS reception device 114, and a long-distance communication device 116.

The first display control device 106 and the second display control device 108 control screen display operations of a first display device 120 and a second display device 122, respectively. In the present embodiment, the navigation device 100, the first display control device 106, the second display control device 108, the first display device 120, and the second display device 122 cooperatively configure the navigation system 160.

Figure 2:
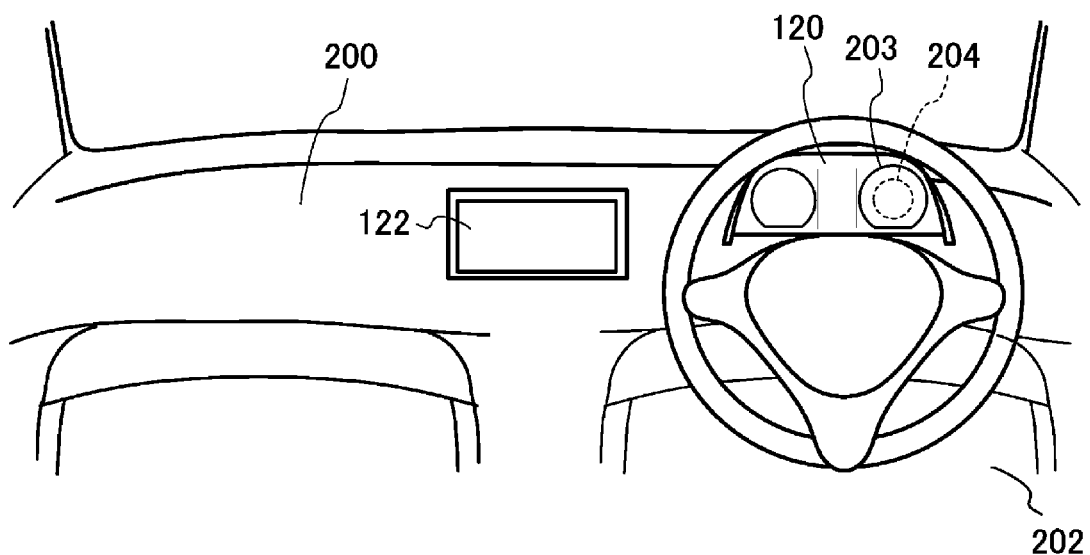
FIG. 2 is a diagram illustrating an exemplary arrangement of a first display device and a second display device in the navigation system of the present invention.

FIG. 2 is a diagram illustrating an exemplary arrangement of the first display device 120 and the second display device 122, which configure the navigation system 160, in an occupant compartment of the vehicle 102. The first display device 120 is arranged on an instrument panel 200 so as to be positioned in front of a driver's seat 202. The second display device 122 is arranged, for example, at a central part of the instrument panel 200 in the vehicle width direction (right-and-left direction in the drawing).

The first display device 120 is, for example, a liquid crystal display device, which displays various information items related to the travelling of the vehicle 102, including the speed of the vehicle 102 and a map, under the control of the first display control device 106. In the present embodiment, as illustrated in FIG. 2, the first display device 120 includes a speed display area 203 in which a map display area 204 is provided.

The second display device 122 is, for example, a liquid crystal display device including a touch panel 124 provided on a display screen. The second display device 122 displays images and videos under the control of the second display control device 108 and outputs input information from the touch panel 124 to the second display control device 108. The second display control device 108 transmits the input information from the touch panel 124, via the network bus 104, to other related devices. The second display control device 108 can be, for example, a so-called display/audio device that reproduces music, video, and the like.

The vehicle information acquisition device 110 detects the current vehicle speed of the vehicle 102 from, at least, a speed sensor 126, and instructs the first display control device 106 to display the detected vehicle speed on the first display device 120. Further, the vehicle information acquisition device 110 may display, on the first display device 120, the acceleration calculated from the time variation of the detected vehicle speed, as well as instantaneous fuel consumption and/or average fuel consumption which can be calculated from the travelling distance of the vehicle 102 and the fuel consumption.

The object detection device 112 detects an object in front of the vehicle 102 with an object sensor 128, and determines whether there is a preceding vehicle in front of the vehicle 102. The object sensor 128 can be, for example, a camera, a radar, and/or a lidar, which is provided on a front bumper of the vehicle 102 or the like. In response to a request from the navigation device 100, the object detection device 112 notifies the navigation device 100 of the presence of any preceding vehicle.

The GPS reception device 114 receives GPS radio waves from a global positioning system (GPS) satellite, and generates current position data indicating the current position (e.g., latitude and longitude) of the vehicle 102 (accordingly, the navigation device 100 provided in the vehicle 102).

The long-distance communication device 116 is, for example, a telematics control unit (TCU), and is a wireless communication device for connecting each device connected to the network bus 104 to the Internet or a telephone line.

The navigation device 100 has a processing device 140 and a storage device 142. The storage device 142 is, for example, configured by a volatile and/or nonvolatile semiconductor memory, and/or a hard disk device, and stores map information 144. The processing device 140 is, for example, a computer including a processor such as a central processing unit (CPU). The processing device 140 may be configured to include a read only memory (ROM) which stores written programs and a random access memory (RAM) for temporarily storing data.

The processing device 140 includes, as functional elements or functional units, a current position acquisition unit 150, a route search unit 152, a preceding vehicle information acquisition unit 154, a map display unit 156, and a scale determination unit 158.

These functional elements provided in the processing device 140 can be realized, for example, when the processing device 140 being a computer executes the programs. The computer programs described above can be stored in an arbitrary computer-readable storage medium. Alternatively, the whole or a part of the above-described functional elements provided in the processing device 140 can be configured by hardware including one or more electronic circuit components.

The current position acquisition unit 150 receives the current position data from the GPS reception device 114, and acquires information about the current position.

The route search unit 152 acquires information about a destination that is designated by an occupant of the vehicle 102, for example, via the touch panel 124 of the second display device 122. Then, the route search unit 152 searches a route from the current position acquired by the current position acquisition unit 150 to the destination, and determines one guidance route, according to the prior art.

The preceding vehicle information acquisition unit 154 acquires, from the object detection device 112, information about the presence of any preceding vehicle travelling within a predetermined distance from the current position of the vehicle 102.

The map display unit 156 instructs the first display control device 106 to display a map on the first display device 120 and superimposes and displays the guidance route and the current position on this map.

The scale determination unit 158 determines a scale of the map displayed on the first display device 120 by the map display unit 156. Specifically, the scale determination unit 158 lowers the scale as the current position approaches an intersection at which it is required to turn along the guidance route, and enlarges the scale as the current position moves through the intersection. Hereinafter, unless otherwise mentioned, it is premised that the "intersection" represents an intersection at which it is required to turn along the guidance route.

In this specification, the meaning of the expression "lowering the scale" or "reducing the scale" is that the actual distance between two points corresponding to 1 cm on the map displayed on the display screen becomes longer, and the meaning of the expression "enlarging the scale" is that the actual distance between two points corresponding to 1 cm on the map displayed on the display screen becomes shorter.

When the interval distance between the intersection nearest from the current position and the next intersection along the guidance route is less than a threshold distance, the scale determination unit 158 starts enlarging the scale when the current position passes through the nearest intersection at a further closer position along the guidance route, compared to a case in which the interval distance is equal to or longer than the threshold distance.

Further, when the interval distance between the intersection nearest from the current position and the next intersection along the guidance route is less than a threshold distance, the scale determination unit 158 decreases the upper limit in the increase of the scale when the current position passes through the nearest intersection, compared to a case in which the interval distance is equal to or longer than the threshold distance.

However, while the preceding vehicle is detected, the scale determination unit 158 holds the scale at the present value.

Figure 3:
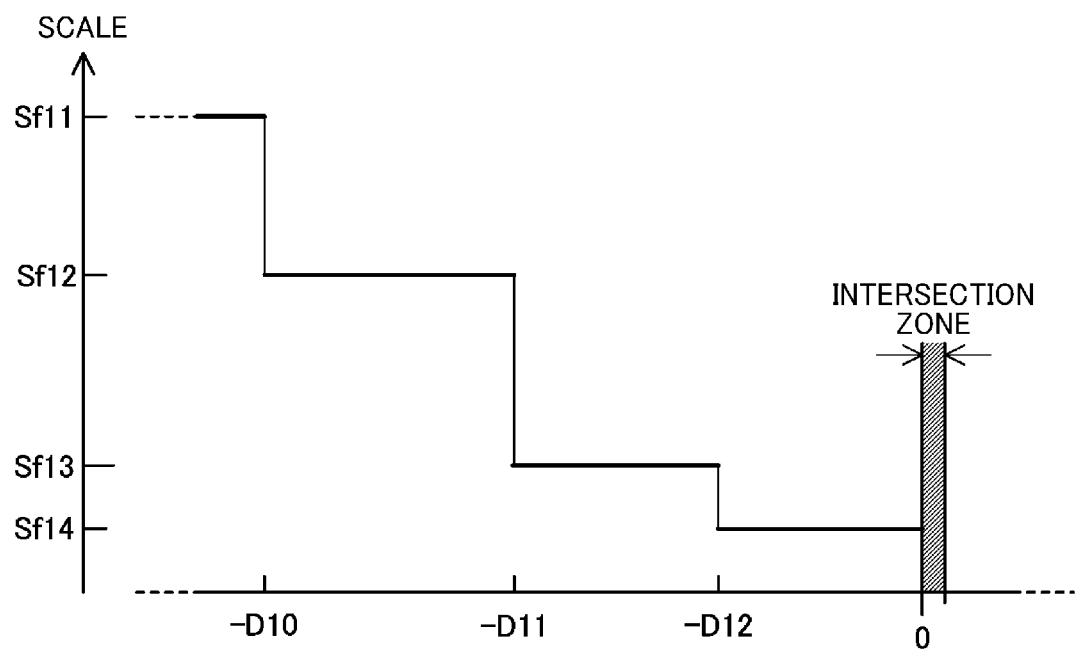
FIG. 3 is a diagram illustrating exemplary scale settings for map display, in the case of approaching an intersection at which it is required to turn along a guidance route.

FIG. 3 is a diagram illustrating an exemplary change in the scale to be set by the scale determination unit 158 when a vehicle approaches an intersection at which the vehicle is required to turn along a guidance route. In FIG. 3, the abscissa axis represents the distance along the guidance route and the origin 0 is the entrance position to the nearest intersection. Further, the ordinate axis indicates values of the scale, in which the value at the position preceding the intersection by a distance D10 is Sf11. For example, Sf11 is a value set by a driver during the previous travelling.

When the vehicle 102 reaches the position preceding the intersection by the distance D10, the scale determination unit 158 lowers the scale from Sf11 to Sf12. Subsequently, the scale determination unit 158 lowers the scale stepwise to Sf13 and Sf14 each time the vehicle reaches positions preceding the intersection by distances D11 and D12. As a result, the intersection at which the vehicle 102 is required to turn while approaching is enlarged and displayed on the first display device 120. Therefore, the driver of the vehicle 102 can easily identify the nearest intersection at which a turning operation is required, even when travelling on a road with many intersections.

Practical values of the distances D10, D11, and D12 and the corresponding scales Sf12, Sf13, and Sf14 can be determined in advance and stored in the storage device 142.

Figure 4:
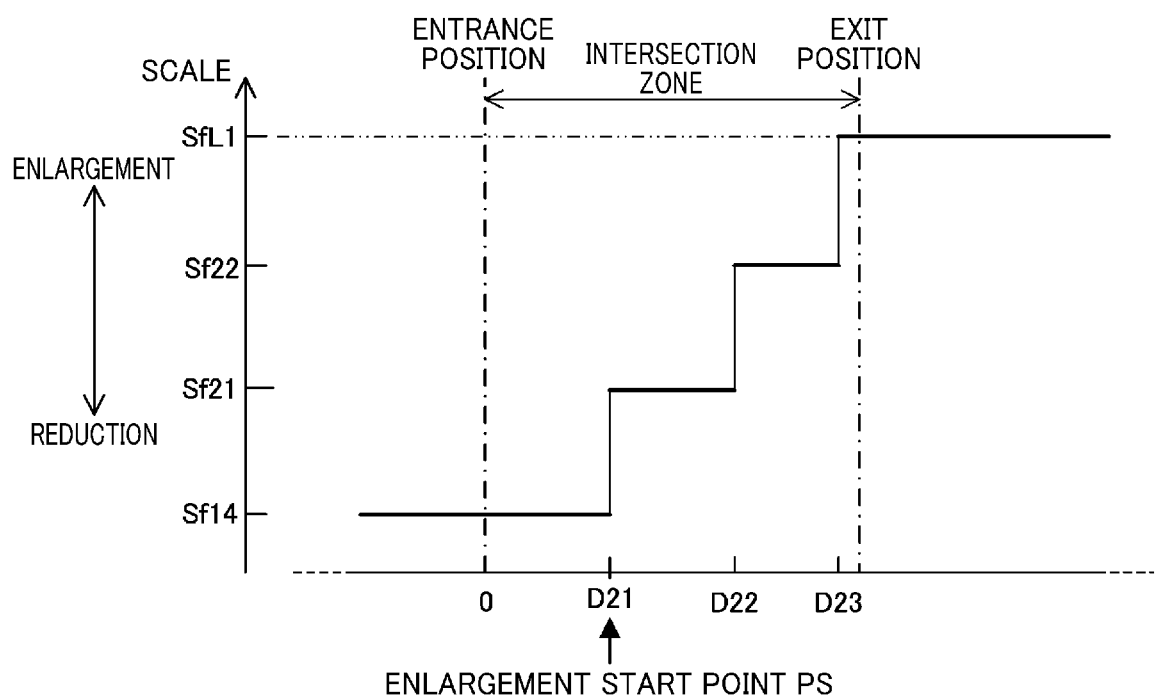
FIG. 4 is a diagram illustrating exemplary scale settings for map display, in a case where two intersections are positioned far from each other on a guidance route.

FIG. 4 is a diagram illustrating an exemplary change in the scale determined by the scale determination unit 158, when the vehicle 102 approaches and passes through an intersection, in a case where the interval distance between the intersection nearest from the current position and the next intersection along the guidance route is equal to or longer than a threshold distance. The threshold distance can be, for example, in a range from 100 m to 200 m. FIG. 4 is similar to FIG. 3 in that the abscissa axis represents the distance along the guidance route, but it should be noted that the graph scale is enlarged in the right-and-left direction in the drawing compared to the abscissa axis of FIG. 3. Further, FIG. 4 is similar to FIG. 3 in that the ordinate axis indicates values of the scale.

In FIG. 4, when the vehicle 102 enters the intersection and reaches a position of distance D21 from an intersection entrance position, the scale determination unit 158 starts enlarging the scale. First, the scale determination unit 158 enlarges the scale from Sf14 to Sf21. Hereinafter, the position at which the scale determination unit 158 starts enlarging the scale when the vehicle 102 passes through the intersection is referred to as an enlargement start point PS. In the example illustrated in FIG. 4, D21 is the enlargement start point PS. After that, the vehicle 102 continues to move in the intersection, and the scale determination unit 158 enlarges the scale from Sf21 to Sf22 and SfL1 each time the vehicle 102 reaches positions of distances D22 and D23 from the intersection entrance position.

SfL1 is a value determined in advance as an enlargement upper limit SfL of the scale value, when the scale is enlarged while the vehicle passes through the intersection. In this case, the scale determination unit 158 can be configured to add a constant increment value to the scale value each time the travelling distance in the intersection increases by a constant increment distance so that the scale can be increased stepwise until it reaches the enlargement upper limit SfL1. The increment distance and the scale increment value can be determined in advance and stored in the storage device 142.

Changing the scale for the map display on the first display device 120 as illustrated in FIG. 4 enables the driver to grasp a route far away after passing through the intersection, as the vehicle turns in the intersection. Therefore, it is possible to quickly execute preparatory actions for travelling after leaving the intersection. As a result, the driver can be assisted by the navigation device 100 in such a way as to realize smooth travelling until after leaving the intersection.

Figure 5:
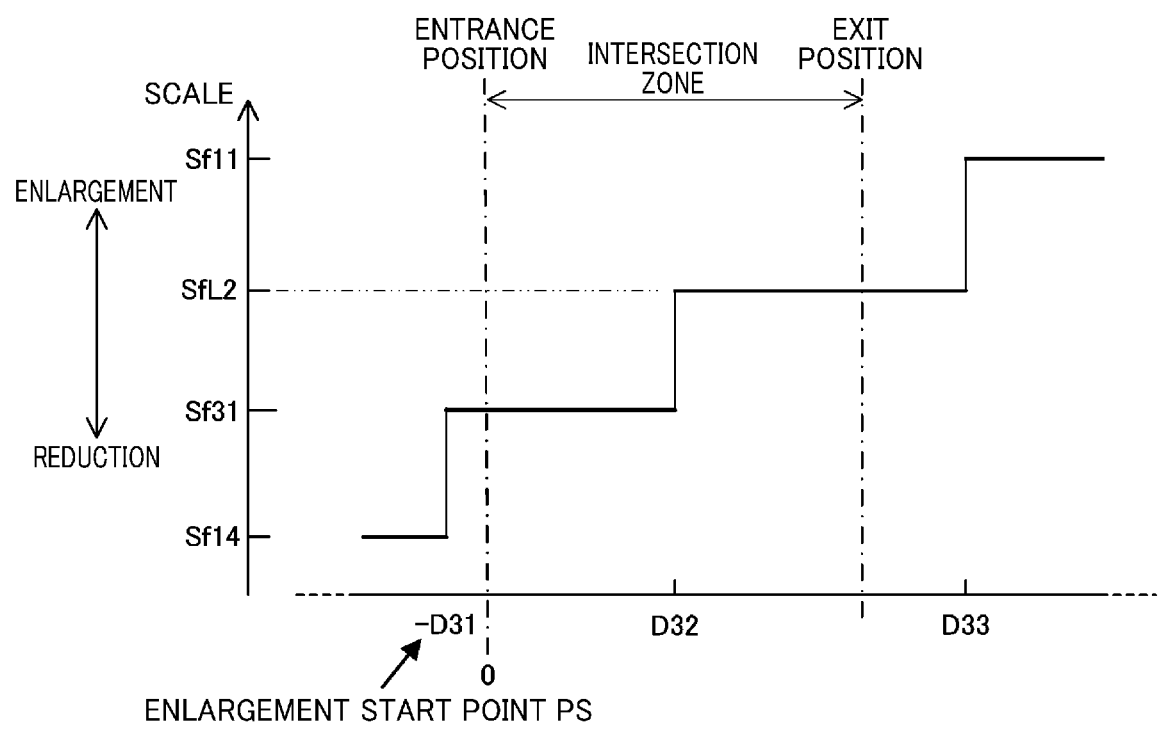
FIG. 5 is a diagram illustrating exemplary scale settings for map display, in a case where two intersections are positioned close to each other on a guidance route.

FIG. 5 is a diagram illustrating an exemplary change in the scale that the scale determination unit 158 determines, when the vehicle 102 approaches and passes through the intersection, in a case where the interval distance between the intersection nearest from the current position and the next intersection along the guidance route is less than a threshold distance and both intersections are adjacently positioned. Regarding the abscissa axis and the ordinate axis, FIG. 5 is similar to FIG. 4.

In FIG. 5, when the vehicle 102 approaches an intersection and reaches a position preceding the intersection entrance position by a distance D31, the scale determination unit 158 starts enlarging the scale. That is, in FIG. 5, the position preceding the intersection entrance position by the distance D31 is the enlargement start point PS. Subsequently, the scale determination unit 158 enlarges the scale stepwise until it reaches an enlargement upper limit SfL2 before the vehicle 102 exits the intersection. Specifically, the scale determination unit 158 enlarges the scale from Sf31 to the enlargement upper limit SfL2 at a point of distance D32 following the intersection entrance position, after enlarging the scale from Sf14 to Sf31 at the position of distance −D31, which is the enlargement start point PS.

In this case, it should be noted that the position of the enlargement start point PS (position of distance −D31) along the guidance route is in front of the position of the enlargement start point PS (position of distance D21) in the case where the intersections are positioned far from each other as illustrated in FIG. 4. It should also be noted that the enlargement upper limit SfL2 in FIG. 5 is smaller than the enlargement upper limit SfL1 in FIG. 4.

The value of the distance D31 corresponding to the enlargement start point PS and the value of the enlargement upper limit SfL2 can be determined in advance and stored in the storage device 142. Further, the scale determination unit 158 can be configured to use the increment distance and the increment value stored in advance in order to add the increment value to the scale value each time the travelling distance in the intersection increases by the increment distance so that the scale can be increased stepwise until it reaches the enlargement upper limit SfL2.

As illustrated in FIG. 5, when the interval distance between the nearest intersection and the next intersection is less than a threshold distance, the navigation device 100 sets the enlargement start point PS at a further closer position along the guidance route, compared to a case in which the interval distance is equal to or longer than the threshold distance (FIG. 4). As a result, when two or more intersections each requiring a vehicle's turning operation are more closely positioned, the navigation device 100 can display each route to the next intersection earlier on the map display and can encourage drivers to take quick preparatory actions.

Further, as illustrated in FIG. 5, when the interval distance between the nearest intersection and the next intersection is less than a threshold distance, the navigation device 100 sets the enlargement upper limit SfL to a smaller value, compared to a case in which the interval distance is equal to or longer than the threshold distance. As a result, the navigation device 100 can prevent driver's intuition about each route to the next intersection from deteriorating due to largely increased map scale (that is, the wider map display) when the vehicle passes through the intersection.

However, as described above, the scale determination unit 158 holds the scale at the present value while the preceding vehicle is detected. Holding the scale for the map display at a constant value in this manner can prevent the map display from being changed when a preceding vehicle is present. As a result, the navigation device 100 can prevent drivers from being distracted by the display of the first display device 120 and prevent driver's attention to the preceding vehicle from being lowered.

Further, in the present embodiment, in order to more effectively assist driver's smooth travelling when the nearest intersection and the next intersection are adjacently positioned, the map display unit 156 increases the ratio of a map display area on the first display device 120 when the intersections are adjacently positioned, compared to a case in which they are not adjacently positioned.

Figure 6:
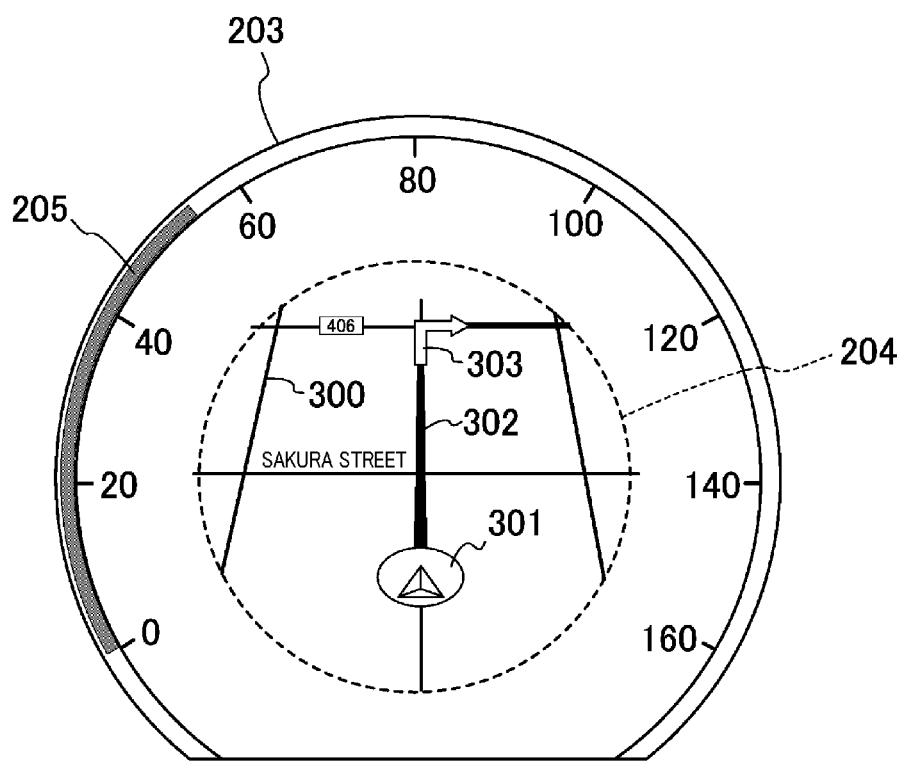
FIG. 6 is a diagram illustrating an exemplary display on the first display device.

FIG. 6 is an exemplary map displayed on the first display device 120 in a case where there are no intersections closely positioned, which indicates the speed display area 203 including the map display area 204 of the first display device 120 illustrated in FIG. 2. According to the illustrated example, the map display area 204 is provided inside numerical values indicating speed values arranged in a circle in the speed display area 203. A map within the map display area 204 includes the display of, for example, roads 300 constructed in a grid pattern in an urban area, a subject vehicle position icon 301 indicating the current position of the vehicle 102 being a subject vehicle, and a guidance route 302 drawn with bold lines. The map further includes the display of a direction pointing icon 303 that indicating the necessity of turning to the right at an intersection ahead. The current speed of the vehicle 102 is indicated by, for example, an arc-shaped speed bar 205 displayed outside the speed values arranged in a circle.

Figure 7:
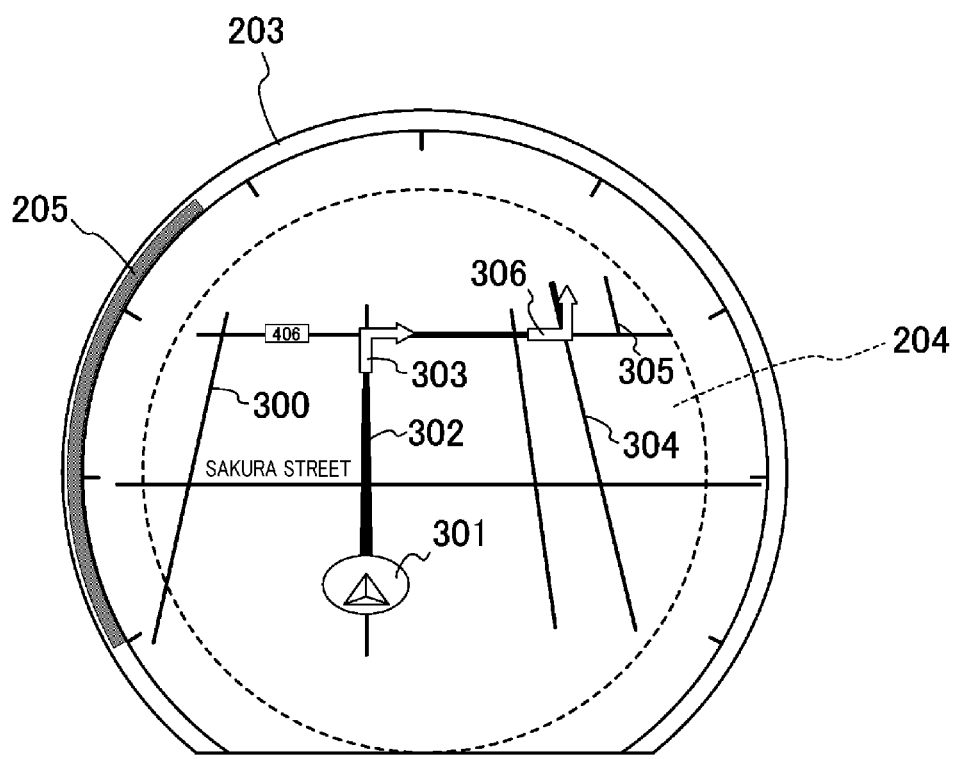
FIG. 7 is a diagram illustrating an exemplary display on the first display device when a vehicle approaches intersections adjacently positioned along a guidance route.

FIG. 7 is an exemplary map displayed on the first display device 120 in a case where there are intersections adjacently positioned. Similar to FIG. 6, FIG. 7 illustrates the speed display area 203 including the map display area 204 of the first display device 120 illustrated in FIG. 2. The map display area 204 in FIG. 7 is larger in size compared to that in FIG. 6 illustrating the case in which the intersections are not closely positioned.

Specifically, in FIG. 7, the display of the speed values is missing. Instead, the map display area 204 is widely provided up to the vicinity of speed scale lines provided radially in the speed display area 203. The expanded map display area 204 internally includes, in addition to the map inside the map display area 204 illustrated in FIG. 6, two roads 304 and 305 extending in the up-down direction in the drawing and a direction pointing icon 306 indicating the necessity of turning to the left after turning to the right at the intersection ahead are displayed.

As mentioned above, the navigation device 100 displays a map with a wider range on the first display device 120 in a case where intersections are adjacently positioned. Therefore, it is possible to enhance the predictivity with respect to the travelling environment and give each driver the sense of security.

Further, in the present embodiment, the map display unit 156 displays a map indicating the guidance route and the current position on the second display device 122, at a scale different from that of the map displayed on the first display device 120. As a result, maps mutually different in scale are displayed on the two display devices. This enables drivers to recognize details of each route to the next intersection on one display device and obtain wider range route information from the other display device. As a result, the sense of security can be enhanced.

Further, when the interval distance between the intersection nearest from the current position and the next intersection along the guidance route is less than a threshold distance, the map display unit 156 displays the map with a range including the guidance route, the current position, and the intersection next to the nearest intersection on the second display device 122. Therefore, even when two or more intersections each requiring a vehicle's turning operation are positioned far from each other to some extent (for example, at intervals of about 50 m, 100 m, or 200 m), drivers can recognize details of the route in the vicinity of the current intersection on the first display device 120 and obtain information about the route to the next intersection on the second display device 122. Thus, the sense of security can be enhanced.

Figure 8:
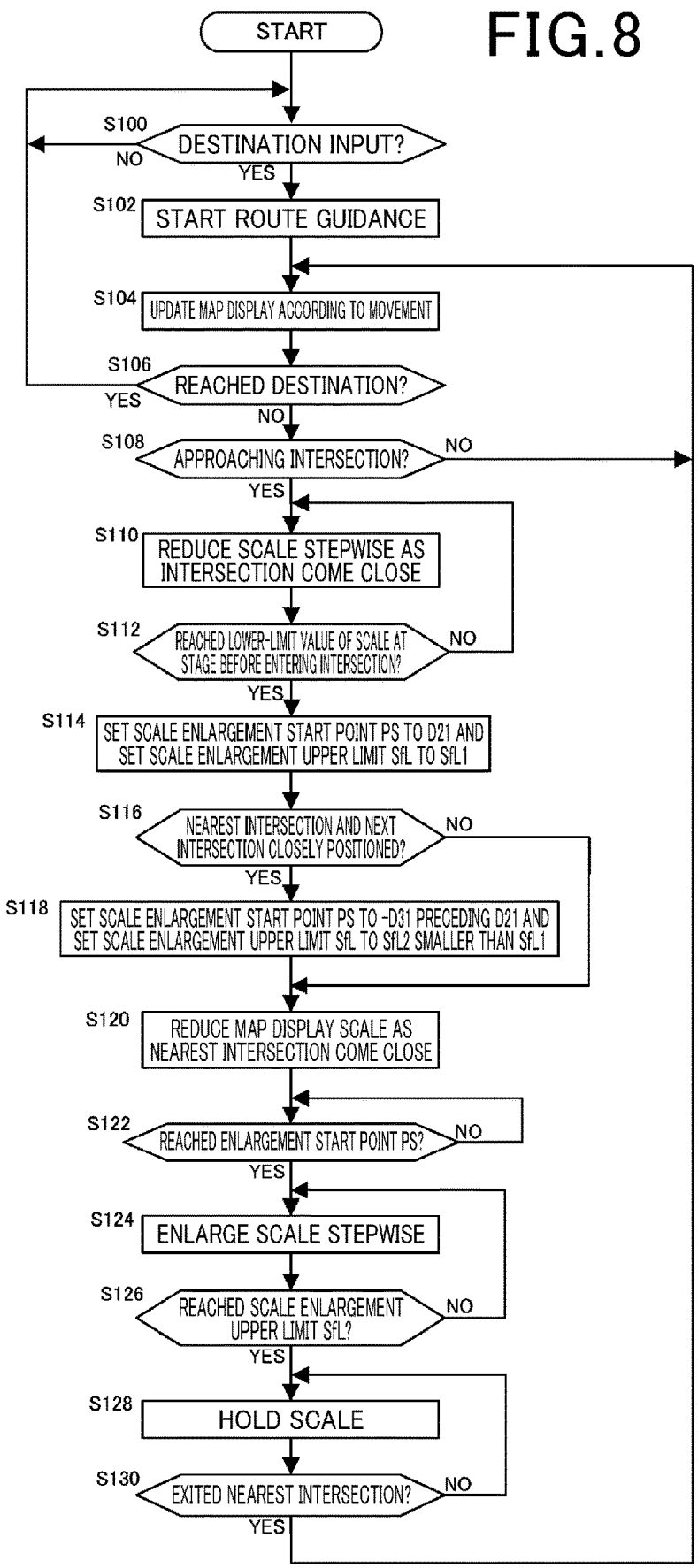
FIG. 8 is a flowchart illustrating an operation procedure of the navigation device.

Next, an exemplary operation procedure of the navigation device 100 that performs route guidance using the first display device 120 will be described with reference to a flowchart illustrated in FIG. 8. The processing illustrated in FIG. 8 starts upon turning on the power of the navigation device 100 and terminates upon turning off the power.

When the processing is started, first in step S100, the route search unit 152 determines whether there is the input of destination. For example, the touch panel 124 of the second display device 122 can be used to input the destination. Then, if there is no input of destination (NO in step S100), the processing returns to step S100 in which the route search unit 152 waits for the input of destination.

On the other hand, when a destination is input (YES in step S100), the route search unit 152 acquires the current position from the current position acquisition unit 150 and determines a guidance route from the current position to the destination. Then, in step S102, the map display unit 156 starts the route guidance by displaying a map indicating the current position and the guidance route on the first display device 120 using, for example, a predetermined default scale value.

Next, in step S104, the map display unit 156 acquires the current position from the current position acquisition unit 150 at predetermined time intervals, and updates the map display of the first display device 120 according to the movement of the current position. Then in step S106, the map display unit 156 determines whether the current position has reached the destination. When the current position has already reached the destination (YES in step S106), the map display unit 156 terminates the route guidance and the processing returns to step S100.

On the other hand, if the current position has not yet reached the destination (NO in step S106), then in step S108, the map display unit 156 determines whether the approaching current position is within the range of a predetermined distance from an intersection (for example, within the range of distance –D10 from the intersection in FIG. 3). When the approaching current position is not within the range of the predetermined distance from the intersection (NO in step S108), the processing returns to step S104 in which the map display unit 156 repeats the above-described processing.

On the other hand, if the approaching current position is within the range of the predetermined distance from the intersection (YES in step S108), then in step S110, the scale determination unit 158 reduces the scale stepwise, for example, in the mode illustrated in FIG. 3, as the intersection comes close. In response to this, the map display unit 156 reduces the scale of the map displayed on the first display device 120 stepwise.

Next, in step S112, the scale determination unit 158 determines whether the scale reduced stepwise has reached a lower-limit value (for example, Sfl4 in FIG. 3) at the stage before entering the intersection. When the scale has not yet reached the lower-limit value (NO in step S112), the processing returns to step S110 in which the scale determination unit 158 repeats the above-described processing.

On the other hand, if the scale has reached the lower-limit value (YES in step S112), then in step S114, the scale determination unit 158 sets D21 and SfL1 in FIG. 4 as default values of the scale enlargement start point PS and the scale enlargement upper limit SfL, respectively. Subsequently, in step S116, the scale determination unit 158 determines whether the nearest intersection and the next intersection are closely positioned by checking if the interval distance is within the range of a predetermined threshold distance. If the nearest intersection and the next intersection are closely positioned (YES in step S116), then in step S118, the scale determination unit 158 newly sets the scale enlargement start point PS and the scale enlargement upper limit SfL to –D31 and SfL2 illustrated in FIG. 5, respectively.

Then, in step S120, the scale determination unit 158 reduces the scale for the map display stepwise as the current position approaches the nearest intersection. On the other hand, when it is determined in step S116 that the nearest intersection and the next intersection are not closely positioned (NO in step S116), the processing directly proceeds to step S120.

Subsequently, in step S122, the scale determination unit 158 determines whether the current position has reached the enlargement start point PS. When the current position has not yet reached the enlargement start point PS (NO in step S122), the processing returns to step S122 in which the scale determination unit 158 waits until the current position reaches the enlargement start point PS.

On the other hand, if the current position has reached the enlargement start point PS (YES in step S122), then in step S124, the scale determination unit 158 enlarges the scale stepwise. Next, in step S126, the scale determination unit 158 determines whether the scale has reached the enlargement upper limit SfL. When the scale has not yet reached the enlargement upper limit SfL (NO in step S126), the processing returns to step S124 in which the scale determination unit 158 repeats the above-described processing.

On the other hand, if the scale has reached the enlargement upper limit SfL (YES in step S126), then in step S128, the scale determination unit 158 holds the scale at the present value. Subsequently, in step S130, the scale determination unit 158 determines whether the current position has exited (has left) the nearest intersection. When the current position has not exited the nearest intersection yet (NO in step S130), the processing returns to step S128 in which the scale determination unit 158 repeats the above-described processing. On the other hand, when the current position has exited the nearest intersection (YES in step S130), the processing returns to step S104.

The present invention is not limited to the configurations of the above-described embodiments and modifications, and can be implemented in various ways without departing from the gist thereof.

In the navigation device 100 described above, the route search unit 152 is configured to perform route searching. However, for example, the route searching may be performed by another computer such as a server that is communicably connected via the long-distance communication device 116.

Further, in the navigation device 100, the route guidance is realized by using the first display device 120 or the combination of the first display device 120 and the second display device 122. However, the voice guidance realized by a speaker 130 connected to the navigation device 100 is also available for the route guidance. For example, in a case where two or more intersections are continuously positioned with an interval distance less than a threshold distance, the navigation device 100 can be configured to output a voice guidance informing the presence of continuous intersections via the speaker 130.

Further, in the navigation device 100, the stepwise reduction/enlargement of the scale is performed when the vehicle passes through an intersection. However, the scale may be continuously reduced and enlarged.

Further, the above-described navigation device 100 can be realized by a portable terminal such as a smartphone that is connectable to the network bus 104 via an appropriate interface device. Such a navigation device can be realized by executing a dedicated application program on the portable terminal.

The navigation device 100 realized by such a portable terminal can be configured to use a display device normally equipped in the portable terminal as the first display device 120 and operate independently, without connecting to the network bus 104, except for some functions using the second display device 122 or the like. In this case, the current position acquisition unit 150 can be configured to use a GPS receiver normally equipped in the portable terminal to acquire the current position of the portable terminal serving as the navigation device 100.

Configurations Supported by the Above Embodiments

The above embodiments support the following configurations.

(Configuration 1)

A navigation device that displays a guidance route to a destination on a map, includes a map display unit configured to display a map on a first display device and display the guidance route and a current position on the map, and a scale determination unit configured to determine a scale of the map to be displayed on the first display device, wherein the scale determination unit lowers the scale as the current position approaches an intersection at which it is required to turn along the guidance route, and enlarges the scale as the current position moves through the intersection.

The navigation device of the configuration 1 can effectively assist drivers in realizing smooth moving, even when a guidance route includes two or more adjacently positioned intersections each requiring a vehicle's turning operation.

(Configuration 2)

The navigation device according to the configuration 1, wherein when an interval distance between the intersection nearest from the current position and a next intersection along the guidance route is less than a threshold distance, the scale determination unit starts enlarging the scale for movement in the nearest intersection at a further closer position along the guidance route, compared to a case in which the interval distance is equal to or longer than the threshold distance.

The navigation device according to the configuration 2 can display each route to the next intersection earlier, when two or more intersections each requiring a vehicle's turning operation are more closely positioned, and can encourage drivers to take quick preparatory actions.
(Configuration 3)

The navigation device according to the configuration 1 or 2, wherein when the interval distance from the current position to the intersection next to the nearest intersection along the guidance route is less than a threshold distance, the scale determination unit decreases the upper limit of the scale to be enlarged for movement in the nearest intersection, compared to a case in which the interval distance is equal to or longer than the threshold distance.

The navigation device of the configuration 3 can prevent driver's intuition about each route to the next intersection from deteriorating due to largely increased map scale when the vehicle passes through the intersection, in a case where two or more intersections each requiring a vehicle's turning operation are more closely positioned.
(Configuration 4)

The navigation system including the navigation device according to any one of the configurations 1 to 3 provided in the vehicle and the first display device provided in the vehicle, wherein the navigation device further includes a preceding vehicle information acquisition unit configured to acquire information about a preceding vehicle ahead of the vehicle, the preceding vehicle travelling within a predetermined distance from the current position, and the scale determination unit holds the scale at a present value while the preceding vehicle is detected.

The navigation system of the configuration 4 can prevent the map display from changing by holding the scale at a constant value when a preceding vehicle is present. As a result, the navigation system can prevent drivers from being distracted by display of the first display device and prevent driver's attention to the preceding vehicle from being lowered.
(Configuration 5)

The navigation system according to the configuration 4, wherein when an interval distance between the intersection nearest from the current position and a next intersection along the guidance route is less than a threshold distance, the map display unit increases a ratio of an area in which the map is displayed on the first display device, compared to a case in which the interval distance is equal to or longer than the threshold distance.

The navigation system of the configuration 5 can display a map with a wider range even at the same scale. Therefore, it is possible to enhance the predictivity with respect to the travelling environment and give each driver the sense of security.
(Configuration 6)

The navigation system according to the configuration 4 or 5, wherein the first display device is provided on the instrument panel of the vehicle so as to be positioned in front of the driver's seat, and displays at least a speed of the vehicle and the map.

The navigation system of the configuration 6 enables drivers to easily recognize the route to the next intersection, because the map is displayed together with the vehicle speed at a position easy to see for the driver looking ahead.
(Configuration 7)

The navigation system according to the configuration 6, wherein the first display device displays the map in a meter display area in which the speed of the vehicle is indicated.

The navigation system of the configuration 7 enables drivers to easily recognize the route to the next intersection because the map is displayed in an area overlapped with the display of the vehicle speed at a position easy to see for the driver looking ahead.
(Configuration 8)

The navigation system according to the configuration 5, in which the map display unit displays the map indicating the guidance route and the current position on the second display device, which is provided on the vehicle and is different from the first display device, at the scale different from that of the map displayed on the first display device.

The navigation system of the configuration 8 displays maps mutually different in scale on the two display devices. This enables drivers to recognize details of each route to the next intersection and obtain wider range route information. As a result, the sense of security can be enhanced.
(Configuration 9)

The navigation system according to configuration 8, in which when the interval distance between the intersection nearest from the current position and the next intersection along the guidance route is less than a threshold distance, the map display unit displays the map with a range including the guidance route, the current position, and the next intersection on the second display device.

The navigation system of the configuration 9 enables drivers to recognize details of the route in the vicinity of the current intersection on the first display device and obtain information about a route to the next intersection on the second display device, even when two or more intersections each requiring a vehicle's turning operation are positioned far from each other to some extent (for example, at intervals of about 50 m, 100 m, or 200 m). Thus, the sense of security can be enhanced.
(Configuration 10)

The navigation system according to the configuration 8 or 9, in which the second display device is provided at a central part of an instrument panel in the vehicle width direction.

The navigation system of the configuration 10 enables drivers to recognize the map displayed on the second display device, without moving the line of sight greatly.
(Configuration 11)

A route guidance method executed by a computer, including a step of determining a scale of a map to be displayed on a display device, and a step of displaying the map indicating a guidance route and a current position on the display device at the scale determined in the determination step. The determination step includes lowering the scale as the current position approaches an intersection at which it is required to turn along the guidance route, and enlarging the scale as the current position moves through the intersection.

The route guidance method of the configuration 11 can effectively assist drivers in realizing smooth moving, even when a guidance route includes two or more adjacently positioned intersections each requiring a vehicle's turning operation.

REFERENCE SIGNS LIST

100 . . . navigation device, 102 . . . vehicle, 104 . . . network bus, 106 . . . first display control device, 108 . . . second display control device, 110 . . . vehicle information acquisition device, 112 . . . object detection device, 114 . . . GPS reception device, 116 . . . long-distance communication device, 120 . . . first display device, 122 . . . second display device, 124 . . . touch panel, 126 . . . speed sensor, 128 . . . object sensor, 130 . . . speaker, 140 . . . processing device, 142 . . . storage device, 144 . . . map information, 150 . . . current position acquisition unit, 152 . . . route search unit, 154 . . . preceding vehicle information acquisition unit, 156 . . . map display unit, 158 . . . scale determination unit, 160 . . . navigation system, 200 . . . instrument panel, 202 . . . driver's seat, 203 . . . speed display area, 204 . . . map display area, 205 . . . speed bar, 300, 304, 305 . . . road, 301 . . . subject vehicle position icon, 302 . . . guidance route, 303, 306 . . . direction pointing icon

What is claimed is:

1. A navigation device that displays a guidance route to a destination on a map, comprising a processor that includes:
   a map display unit configured to display a map on a first display device and display the guidance route and a current position on the map; and
   a scale determination unit configured to determine a scale of the map to be displayed on the first display device, wherein
   an intersection zone of a nearest intersection at which it is required to turn along the guidance route is defined between an entrance position and an exit position,
   when the current position reaches a position preceding by a first predetermined distance the entrance position of the nearest intersection, the scale determination unit lowers the scale, and further lowers the scale as the current position moves from the position preceding by the first predetermined distance and approaches the entrance position of the nearest intersection, and
   when the current position enters the intersection zone of the nearest intersection from the entrance position and reaches a position of a second predetermined distance from the entrance position of the nearest intersection, the position of the second predetermined distance being within the intersection zone, the scale determination unit enlarges the scale, and further enlarges the scale as the current position moves from the position of the second predetermined distance toward the exit position through the intersection zone of the nearest intersection.

2. The navigation device according to claim 1, wherein when an interval distance between the intersection nearest from the current position and a next intersection along the guidance route is less than a threshold distance, the scale determination unit starts enlarging the scale for movement in the nearest intersection at a further closer position along the guidance route, compared to a case in which the interval distance is equal to or longer than the threshold distance.

3. The navigation device according to claim 1, wherein when the interval distance from the current position to an intersection next to the nearest intersection along the guidance route is less than a threshold distance, the scale determination unit decreases an upper limit of the scale to be enlarged for movement in the nearest intersection, compared to a case in which the interval distance is equal to or longer than the threshold distance.

4. A navigation system comprising the navigation device according to claim 1 provided in a vehicle and the first display device provided in the vehicle,
   wherein
   the processor of the navigation device further includes a preceding vehicle information acquisition unit configured to acquire information about a preceding vehicle ahead of the vehicle, the preceding vehicle travelling within a predetermined distance from the current position, and
   the scale determination unit holds the scale at a present value while the preceding vehicle is detected.

5. The navigation system according to claim 4, wherein when an interval distance between the intersection nearest from the current position and a next intersection along the guidance route is less than a threshold distance, the map display unit increases a ratio of an area in which the map is displayed on the first display device, compared to a case in which the interval distance is equal to or longer than the threshold distance.

6. The navigation system according to claim 4, wherein the first display device is provided on an instrument panel of the vehicle so as to be positioned in front of a driver's seat, and displays at least a speed of the vehicle and the map.

7. The navigation system according to claim 6, wherein the first display device displays the map in a meter display area in which the speed of the vehicle is indicated.

8. The navigation system according to claim 5, wherein the map display unit displays the map indicating the guidance route and the current position on a second display device, which is provided on the vehicle and is different from the first display device, at a scale different from that of the map displayed on the first display device.

9. The navigation system according to claim 8, wherein when the interval distance between the intersection nearest from the current position and the next intersection along the guidance route is less than a threshold distance, the map display unit displays the map with a range including the guidance route, the current position, and the next intersection on the second display device.

10. The navigation system according to claim 8, wherein the second display device is provided at a central part of an instrument panel in a vehicle width direction.

11. A route guidance method executed by a computer, comprising:
    a step of determining a scale of a map to be displayed on a display device; and
    a step of displaying the map indicating a guidance route and a current position on the display device at the scale determined in the determination step,
    wherein
    an intersection zone of a nearest intersection at which it is required to turn along the guidance route is defined between an entrance position and an exit position,
    the determination step includes, when the current position reaches a position preceding by a first predetermined distance the entrance position of the nearest intersection, lowering the scale, and further lowering the scale as the current position moves from the position preceding by the first predetermined distance and approaches the entrance position of the nearest intersection, and
    the determination step includes, when the current position enters the intersection zone of the nearest intersection from the entrance position and reaches a position of a second predetermined distance from the entrance position of the nearest intersection, the position of the second predetermined distance being within the intersection zone, enlarging the scale, and further enlarging the scale as the current position moves from the position of the second predetermined distance toward the exit position through the intersection zone of the nearest intersection.

12. A navigation system comprising a navigation device and a first display device, the navigation device and the first display device being provided in a vehicle, the navigation device displaying a guidance route to a destination on a map and comprising a processor that includes:

a map display unit configured to display a map on the first display device and display the guidance route and a current position on the map;

a scale determination unit configured to determine a scale of the map to be displayed on the first display device; and a preceding vehicle information acquisition unit configured to acquire information about a preceding vehicle ahead of the vehicle, the preceding vehicle travelling within a predetermined distance from the current position, wherein the scale determination unit lowers the scale as the current position approaches an intersection at which it is required to turn along the guidance route, and enlarges the scale as the current position moves through the intersection, the scale determination unit holds the scale at a present value while the preceding vehicle is detected, when an interval distance between the intersection nearest from the current position and a next intersection along the guidance route is less than a threshold distance, the map display unit increases a ratio of an area in which the map is displayed on the first display device, compared to a case in which the interval distance is equal to or longer than the threshold distance, the map display unit displays the map indicating the guidance route and the current position on a second display device, which is provided on the vehicle and is different from the first display device, at a scale different from that of the map displayed on the first display device.

13. The navigation system according to claim 12, wherein when the interval distance between the intersection nearest from the current position and the next intersection along the guidance route is less than a threshold distance, the map display unit displays the map with a range including the guidance route, the current position, and the next intersection on the second display device.

14. The navigation system according to claim 12, wherein the second display device is provided at a central part of an instrument panel in a vehicle width direction.

* * * * *